Patented Mar. 12, 1935

1,993,773

UNITED STATES PATENT OFFICE 1,993,773

NON-CORROSIVE LIQUID

Richard G. Clarkson, Wilmington, Del., assignor to E. I. du Pont de Nemours & Company, Wilmington, Del., a corporation of Delaware No Drawing. Application March 1, 1933,
Serial No. 659,177

17 Claims. (Cl. 252—5)

This invention relates to compositions of matter for preventing the corrosion of metals by aqueous liquids, and more particularly to the prevention of corrosion of automobile radiators by the cooling liquid.

The corrosive effect of aqueous liquids on metals, due to the combined action of moisture and oxygen, is well known and many expedients to eliminate or counteract this effect in liquids used in automobile radiators, house radiators used in hot water systems, boilers, et cetera, have been proposed. The anti-freeze liquids used today for automobile radiators employ two classes of freezing point depressants, namely, electrolytes, such as highly soluble salts, for example, calcium chloride, sodium lactate, and magnesium chloride, or non-electrolytes, such as methanol, ethanol, glycerol, ethylene glycol, and sometimes glucose and honey. The anti-freeze liquids employing non-electrolytes do not have as great a corrosive action on metals as those employing electrolytes, but still the corrosive action is considerably greater than that of water alone and constitutes a distinct disadvantage in practical use.

Others have recognized that solutions of non-electrolytes tend to corrode metals in contact therewith and have attempted to prevent such corrosion.

Patent No. 1,877,398 granted to Hague, discloses the use of certain soluble oils for this purpose. A copending application of Downing and Clarkson 580,730, filed on or about December 12, 1931, discloses the use of other soluble oils, both alone and with o-toluidine. These soluble oils, particularly when employed in conjunction with o-toluidine, have proved to be very effective. However, they do not entirely prevent corrosion of iron, copper and brass.

An object of the present invention is to provide a new and improved composition of matter for use as a corrosion inhibitor. A further object is to provide cooling liquids which have been rendered less corrosive to metals and particularly to such cooling liquids containing non-electrolyte freezing point depressants. A still further object is to advance the art. Other objects will appear hereinafter.

These objects may be accomplished in accordance with my invention which comprises dissolving in a soluble oil a primary aromatic amine and mercapto-benzothiazole whereby a composition is obtained which, when incorporated in a cooling liquid, will render such cooling liquid less corrosive to metal than other corrosion inhibitors employed heretofore.

By the term "soluble oil" as used herein is meant a composition comprising a neutral oil immiscible with water, containing an emulsifying agent in solution in sufficient amount so that the composition will spontaneously form a stable emulsion when poured into water. The most effective oil to be used in the soluble oil is the oil most resistant to oxidation, namely, a refined paraffin oil, but other oils, such as non-drying oils of the vegetable or animal type, for example, palm oil, cocoanut oil, and wool fat, may be used effectively. Also other liquids having a boiling point higher than water and immiscible with water may be used. Among these may be mentioned xylene, lauryl alcohol, diphenyl ether, o-dichloro-benzene, nitrobenzene, dichloro diethyl ether, tetrachloroethane, cyclohexanone, cyclohexanol, and acetophenone.

The emulsifying agent to be used in the corrosion inhibitor may vary widely. The following emulsifying agents are suitable for the preparation of soluble oils; soap and oleic acid, sulphonated castor oil and oleic acid, petroleum sludge acids, and sulphonated alkylated polynuclear aromatic hydrocarbons. The latter are not commonly used in the preparation of soluble oils. Small additions of other materials, such as alcohol, acetone, or pine oil, may be made to the corrosion inhibitor for the purpose of obtaining a homogeneous mixture.

The proportion of emulsifying agent in the soluble oil may vary widely, but it has been found that a proportion of 50–90% of oil, or other high boiling liquid, to 50–10% of emulsifying agent is most suitable. In any event, the proportion of emulsifying agent should be sufficient so that the corrosion inhibitor will form a spontaneous stable emulsion when poured into water.

By the term "primary aromatic amine" as used herein is meant an aromatic amino compound having at least one primary amino group attached to an aromatic nucleus. Among the amines which may be employed for my purpose may be mentioned aniline, p-toluidine, o-toluidine, and the like. Of these amines, we have found o-toluidine to be the most satisfactory and this compound is therefore preferred.

The corrosion inhibitors of my invention may be prepared in various ways. One method comprises mixing the oil or its equivalent with the emulsifying agent, then dissolving the mercapto-benzothiazole in the soluble oil thus produced by heating and finally adding the o-toluidine. The amount of mercapto-benzothiazole and the o-toluidine in the corrosion inhibitor may vary within rather wide limits. However, I preferably prepare the corrosion inhibitor so that it contains about 5% of o-toluidine and from about 0.5% to about 5% of mercapto-benzothiazole, the rest being the soluble oil. This corrosion inhibitor is added to the aqueous liquid for use in the cooling or heating system in an amount of about 0.5 to about 2% of the solution. Larger or smaller amounts of the inhibitor may be employed but I have found that the above amounts give a maximum of protection, commensurate with reasonable economy of material.

The cooling liquid to which the inhibitor is added may be mere water or a water solution of a non-electrolyte freezing point depressant such as ethanol, methanol, glycerol, ethylene glycol, glucose, honey or the like. The aqueous solution to which my corrosion inhibitor is to be added should contain no substantial amounts of an electrolyte since the soluble oils tend to be salted out of strong electrolyte solutions and thus become ineffective.

In order to more clearly illustrate my invention, the preferred mode of carrying the same into effect and to point out the advantages over prior compositions employed for this purpose the following examples are given:

Example 1

A soluble oil was prepared by mixing together about 36 to 40 parts of neutralized petroleum sludge acids and 54 parts of refined paraffin oil. This soluble oil was divided into several portions, one of which was designated inhibitor A. To a second portion, o-toluidine was added in an amoun to form 5% and this portion designated inhibitor B. To another portion of the soluble oil, 1% of mercapto-benzothiazole was added and the resulting composition designated inhibitor C. A fourth portion of the soluble oil was made up to contain 5% of o-toluidine and 1% of mercapto-benzothiazole and was designated inhibitor D. One part of each of these inhibitors was added to a different portion comprising 200 parts of a 35% glycerol solution. A weighed strip of iron and another of brass were added to each solution. These solutions were then aerated under reflux condensers by bubbling oxygen through the solutions while maintaining the solutions at 80° C. The aeration and heating of the solutions containing inhibitors A, B and C were continued for 120 hours. The solution containing inhibitor D and a solution containing no inhibitor were heated and aerated for 206 hours. At the end of these periods of time, the strips of metal were removed from the solutions, washed, dried and re-weighed. The loss of weight of each strip of metal in mg. per square inch for 100 hours was then calculated. The results of this experiment are shown in the following table:

Table

| Inhibitor | Soluble oil | O-toluidine | Mercapto-benzothiazole | Loss in wt. of strips in mg./sq. in/100 hrs. | |
|---|---|---|---|---|---|
| | | | | Iron | Brass |
| | Percent | Percent | Percent | | |
| None | | | | 54.6 | 1.41 |
| A | 100 | | | 0.29 | 1.14 |
| B | 95 | 5.0 | | 0.22 | 0.84 |
| C | 99 | | 1.0 | | 0.23 |
| D | 94 | 5.0 | 1.0 | 0.08 | 0.04 |

Example 2

The inhibitor D of Example 1 was incorporated in water in the proportion of one part inhibitor to 200 parts of water. This solution was heated and aerated as described in Example 1 for 300 hours. At the end of this time neither of the metal strips had lost any weight which could be detected.

Example 3

Inhibitors D and B of Example 1 were dissolved in separate portions of a solution of 40% by weight of ethyl alcohol in water in the ratio of 1 part inhibitor to each 100 parts of solution. After heating and aerating as in Example 1, for a period of 200 hours, no loss in weight could be detected from either of the metal strips from the solution containing inhibitor D. The loss in weight of the iron strip from the solution containing inhibitor B amounted to 0.13 mg./sq. in./100 hours and the loss in weight of the brass strip from the same solution amounted to 0.52 mg./sq. in./100 hrs.

The above examples demonstrate the superiority of the composition of my invention over well known types both in water alone and in water solutions of non-electrolytes.

The compositions of my invention are useful in all cases in which hot aqueous liquids containing not more than small amounts of electrolytes are in contact with metallic surfaces in the presence of air, oxygen or oxygen containing gases. While the compositions of my invention are primarily intended for use in cooling systems of internal combustion engines, they may be used to advantage in circulating hot water heating systems and in steam boilers, in which cases the corrosion due to moist oxygen is known to be severe.

Measurement has shown that the thin film of oil deposited on the metal surface, when my corrosion inhibitors are employed, is so thin that the heat transfer between metal and liquid is only slightly affected.

While I have disclosed compositions of matter comprising specific ingredients in specific amounts, it will be readily understood, by those skilled in the art, that many changes and modifications may be made in the specific ingredients and the proportions employed without departing from the spirit of my invention. Accordingly, the scope of my invention is to be limited solely by the appended claims, construed as broadly as is permissible in view of the prior art.

I claim:

1. A corrosion inhibitor for cooling systems employing water in the absence of substantial amount of electrolytes which comprises a soluble oil having incorporated therein a small amount of mercapto-benzothiazole and a small amount of a primary aromatic amine, in which the aromatic group consists of carbon and hydrogen.

2. A corrosion inhibitor for cooling systems employing water in the absence of substantial amounts of electrolytes which comprises a soluble oil having incorporated therein about 0.5% to about 5.0% of mercapto-benzothiazole and about 5% of a primary aromatic amine, in which the aromatic group consists of carbon and hydrogen.

3. A corrosion inhibitor for cooling systems employing water in the absence of substantial amounts of electrolytes which comprises a soluble oil having incorporated therein about 1.0% of mercapto-benzothiazole and about 5% of a primary aromatic amine, in which the aromatic group consists of carbon and hydrogen.

4. A corrosion inhibitor for cooling systems employing water in the absence of substantial amounts of electrolytes which comprises a soluble oil having incorporated therein a small amount of mercapto-benzothiazole and a small amount of o-toluidine.

5. A corrosion inhibitor for cooling systems employing water in the absence of substantial amounts of electrolytes which comprises a soluble oil having incorporated therein about 0.5% to about 5.0% of mercapto-benzothiazole and about 5% of o-toluidine.

6. A corrosion inhibitor for cooling systems employing water in the absence of substantial amounts of electrolytes which comprises a soluble oil having incorporated therein about 1.0% of mercapto-benzothiazole and about 5% of o-toluidine.

7. A non-corrosive liquid for cooling systems comprising water having incorporated therein a small amount of a corrosion inhibitor which comprises a soluble oil, a small amount of mercapto-benzothiazole and a small amount of a primary aromatic amine, in which the aromatic group consists of carbon and hydrogen, in the absence of substantial amounts of an electrolyte.

8. A non-corrosive liquid for cooling systems comprising water having incorporated therein a small amount of a corrosion inhibitor which comprises a soluble oil, about 0.5% to about 5.0% of mercapto-benzothiazole and about 5% of a primary aromatic amine, in which the aromatic group consists of carbon and hydrogen, in the absence of substantial amounts of an electrolyte.

9. A non-corrosive liquid for cooling systems comprising water having incorporated therein a small amount of a corrosion inhibitor which comprises a soluble oil, about .5% to about 5% of mercapto-benzothiazole and about 5% of o-toluidine in the absence of substantial amounts of an electrolyte.

10. A corrosion inhibitor for cooling systems employing water in the absence of substantial amounts of electrolytes which comprises a soluble oil having incorporated therein about 0.5% to about 5.0% of mercapto-benzothiazole and about 5% of a primary aromatic amine of the benzene series, in which the aromatic group consists of carbon and hydrogen.

11. A non-corrosive liquid for cooling systems comprising water having incorporated therein a small amount of a corrosion inhibitor which comprises a soluble oil having incorporated therein about 0.5% to about 5.0% of mercapto-benzothiazole and about 5% of a primary aromatic amine of the benzene series, in which the aromatic group consists of carbon and hydrogen, in the absence of substantial amounts of an electrolyte.

12. A non-corrosive liquid for cooling systems comprising an aqueous solution of a freezing point depressant, having the characteristics of ethanol, glycerol, ethylene glycol, glucose and honey, having incorporated therein a small amount of a corrosion inhibitor which comprises a soluble oil having incorporated therein about 0.5% to about 5.0% of mercapto-benzothiazole and about 5% of a primary aromatic amine of the benzene series, in which the aromatic group consists of carbon and hydrogen, in the absence of substantial amounts of an electrolyte.

13. A non-corrosive liquid for cooling systems comprising an aqueous solution of a freezing point depressant, having the characteristics of ethanol, glycerol, ethylene glycol, glucose and honey, having incorporated therein a small amount of a corrosion inhibitor which comprises a soluble oil, about 0.5% to about 5% of mercapto-benzothiazole and about 5% of o-toluidine, in the absence of substantial amounts of an electrolyte.

14. A corrosion inhibitor for cooling systems employing water in the absence of substantial amounts of electrolytes which comprises a soluble oil having incorporated therein a small amount of mercapto-benzothiazole and a small amount of aniline.

15. A corrosion inhibitor for cooling systems employing water in the absence of substantial amounts of electrolytes which comprises a soluble oil having incorporated therein about 0.5% to about 5.0% of mercapto-benzothiazole and about 5% of aniline.

16. A non-corrosive liquid for cooling systems comprising water having incorporated therein a small amount of a corrosion inhibitor which comprises a soluble oil, about .5% to about 5% of mercapto-benzothiazole and about 5% of aniline in the absence of substantial amounts of an electrolyte.

17. A non-corrosive liquid for cooling systems comprising an aqueous solution of a freezing point depressant, having the characteristics of ethanol, glycerol, ethylene glycol, glucose and honey, having incorporated therein a small amount of a corrosion inhibitor which comprises a soluble oil, about 0.5% to about 5% of mercapto-benzothiazole and about 5% of aniline, in the absence of substantial amounts of an electrolyte.

RICHARD G. CLARKSON.